United States Patent [19]

Grzyll

[11] 4,363,402
[45] Dec. 14, 1982

[54] OPEN-FACED WELDING ROD/STUB RECEPTACLE

[76] Inventor: John V. Grzyll, 606 W. Roberta, Fullerton, Calif. 92632

[21] Appl. No.: 261,879

[22] Filed: May 8, 1981

[51] Int. Cl.³ .............................................. B65D 85/26
[52] U.S. Cl. ................................. 206/380; 220/94 R; 206/443; 206/818
[58] Field of Search ............... 206/372, 379, 380, 443, 206/818; 211/60 R, 60 A, 69; 220/94 R, 95

[56] References Cited

U.S. PATENT DOCUMENTS 2,325,506  7/1943  Grace ............................ 206/380 X
3,239,057  3/1966  Manz ................................ 206/380

Primary Examiner—William Price
Assistant Examiner—Brenda J. Ehrhardt
Attorney, Agent, or Firm—Francis X. LoJacono

[57] ABSTRACT

An open-faced welding rod and stub receptacle having a box-like configuration defined by side walls and a bottom wall, and including a front serrated-edge wall and a full rear-retainer wall. The rear-retainer wall includes an inwardly bent lip, providing a support pocket for the rods and stubs. Mounted to the front and side walls is a handle defining a rod retainer and divider member by which the rods are kept separated and the receptacle can be carried or hung, the handle being disposed so that the open-faced receptacle, when carried or hung, will assume an angular position, the handle including an elevation-securing aperture. Transversely mounted between the side walls in a retainer rod, in order to assist in preventing the rods from falling out of the open-faced receptacle, the front wall including a second securing aperture and the rear wall having a slag-pick holder mounted thereto. The receptacle can further include magnetic support legs to provide a means for mounting the receptacle to a metal surface.

9 Claims, 3 Drawing Figures

OPEN-FACED WELDING ROD/STUB RECEPTACLE

BACKGROUND OF THE INVENTION

1. Field of the Invention

This invention relates generally to the welding-tool art, and is more particularly related to an open-faced receptacle that is adapted to receive, carry and store various sizes of welding rods and stubs.

2. Description of the Prior Art

It is well known in the art that various problems and difficulties are encountered in providing suitable means for carrying and storing welding rods, including suitable means for receiving and storing short rod pieces (otherwise known as stubs).

The closest prior art of which I am aware is found in U.S. Pat. No. 3,239,057 to Manz which comprises two separate pouches—one pouch to hold full length rods and the other short pouch to hold stubs. This device is designed to be mounted on the weldor's belt or clothing, which is not desirable under various working conditions. Further, the size of the opening of the stub-receiving pouch is limited, and occasionally is positioned so as not to be accessible to the weldor for disposing of used rods.

Another U.S. Pat. (No. 2,325,506 to Grace) relates more particularly to the combination of a weldor's shield and supply container.

The above-mentioned patents are subject to various problems and deficiencies, and they also have features that restrict their use.

SUMMARY OF THE INVENTION

In accordance with the invention, there is claimed a new and improved receptacle for carrying and storing welding rods and welding stub members, wherein the receptacle is formed substantially as an open-faced box-like container having a handle that is designed for carrying, as well as for mounting and securing to various structures—including attaching it to the weldor, if necessary.

Thus, it is an important object of the invention to provide an open-faced rod and stub receptacle that allows easy access to the rod and stub compartment at all times, the compartment being defined by high side walls, by a full rear retainer wall having an angularly disposed lip member, by a bottom wall, and by a front serrated-edge wall formed substantially lower than the side or rear walls, so as to establish a well-defined open-faced area.

Another object of the invention is to provide an open-faced receptacle of this type wherein the handle thereof is angularly positioned to allow the receptacle to be carried or hung at an angular rather than at a vertical position. This allows for the stubs to be held within a pocket defined by the rear wall of the receptacle.

Stll another object of the invention is to provide a device of this character that allows rods of various sizes to be positioned together in respective areas defined by rod dividers positioned along the handle and the front wall.

It is another object of the present invention to provide a welding rod and stub receptacle of this type wherein the handle and front wall include apertures to aid in securing the receptacle in any suitable manner.

A further object of the invention is to provide a device of this character that is relatively inexpensive to manufacture, and that is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
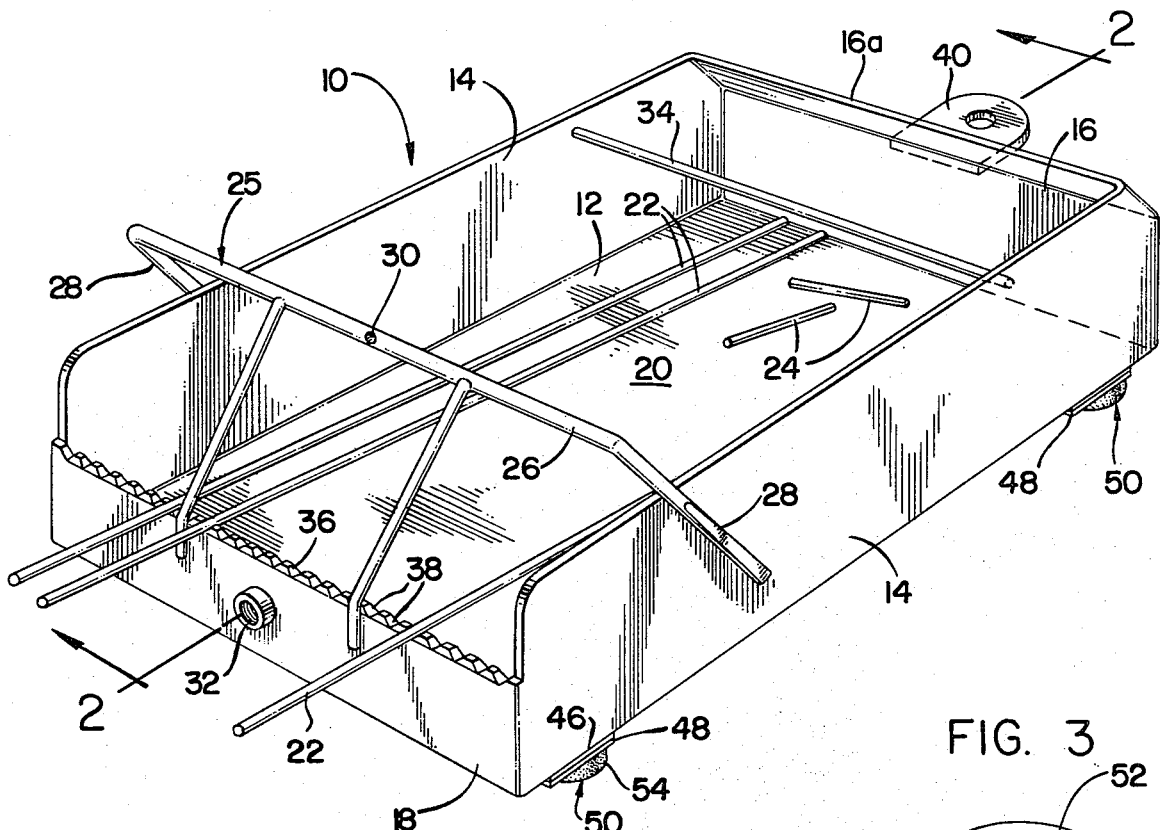
FIG. 1 is a perspective view of the open-faced welding rod and stub receptacle.
Figure 3:
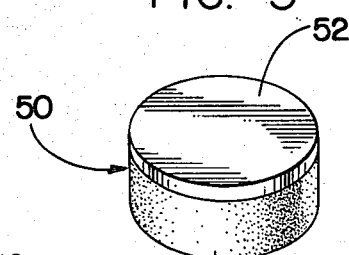
FIG. 3 is a perspective view of a magnetic leg member which is adapted to be magnetically attached to the underside of the receptacle.
Figure 2:
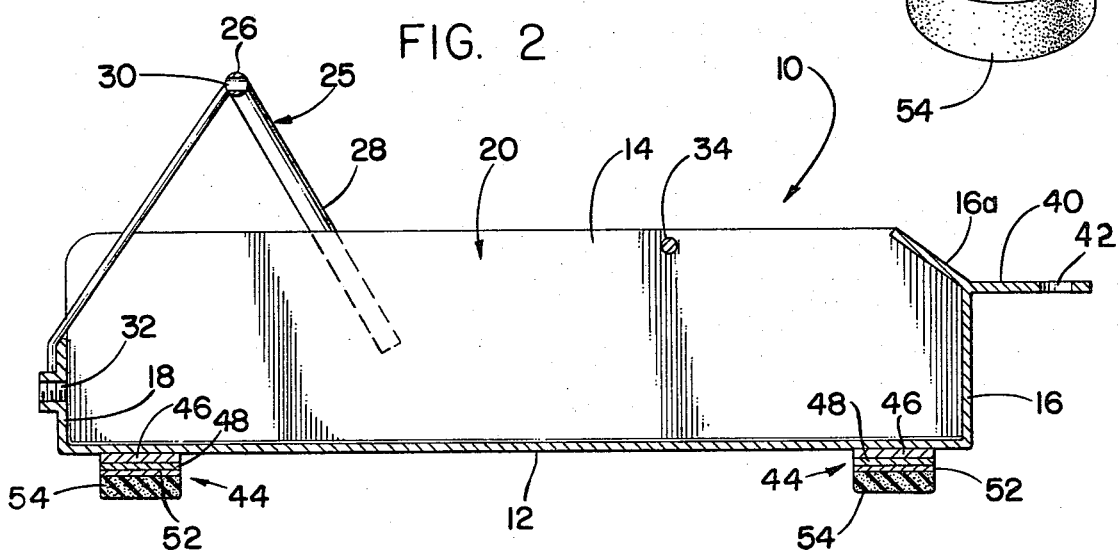
FIG. 2 is a longitudinal cross-sectional view taken substantially along line 2—2 of FIG. 1, illustrating welding rods and stubs of various sizes being stored within the open-faced compartment thereof.

Referring more particularly to the drawings by characters of reference, FIG. 1 and FIG. 2, disclose an open-faced welding rod and stub receptacle, which is generally indicated by numeral 10 and which comprises a box-like configuration having a substantially flat bottom wall 12 integrally formed with elongated side walls 14 having a given height, together with a rear retainer wall 16 having the same height as the side walls 14. There is provided a front wall 18 which is reduced in height from that of the side and rear walls 14 and 16, respectively.

Accordingly, the arrangement of the walls provides a receptacle that defines an open-faced compartment, indicated generally at 20. Thus, welding rods 22 can be readily positioned for carrying or storing therein, together with stubs, as indicated at 24.

A means for carrying the receptacle is provided by a handle designated at 25, the handle being formed by a rod-support member 26 which is bent at opposite ends to form attaching arm members 28. Arm members 28 are fixedly attached to side walls 14 in any suitable manner whereby the handle is disposed angularly in a forward direction. A suitable angle would be approximately 45°. Hence, handle 25 further defines a means for mounting, securing or hanging the receptacle. When the receptacle is mounted (to a pipe or like fixture, for example) it will hang downwardly at an angle of approximately 45°. This allows rods 22 to be supported by rear wall 16, and stubs 24 to be held within compartment 20 by rear wall 16 which includes an inwardly bent lip member 16a. Further means to secure the receptacle are provided—one being an aperture 30 formed in rod handle 26, the other being a reinforced threaded hole 32 formed in the center of front wall 18. Hole 32 allows receptacle 10 to be supported at any suitable angle.

A retainer means, to prevent welding rods 22 from falling out of the open-faced compartment 20, comprises the bent lip member 16a and a transverse retainer rod 34 mounted between side walls 14.

A rod-separating means is also included wherein the free edge of the front wall is serrated by a plurality of tooth-like members 36. These tooth members form notches 38 in which rods 22 are held in place, as seen in FIG. 1. A further separating means is provided by divider members connected between the front wall 18 and the rod handle 26. Thus, various sizes or types of welding rods can be segregated from each other.

A weldor may choose to carry his slag pick with the receptacle. Thus, there is provided a carrying means which comprises an ear member 40 formed on or secured to the rear wall 16, the ear having a hole 42 to receive the pick therein.

Receptacle 10 may be formed from any suitable material capable of withstanding abuse, and it can further include support means, generally indicated at 44, which comprises a pair of insulation strips 46 which extend across the width of bottom wall 12 adjacent the forward and rear portions thereof.

Attached to each insulation strip 46 is an elongated magnetic member 48 to which leg member 50 is attached. Leg member 50 includes a magnet 52 and an insulated shoe 54 made from a suitable material to prevent the receptacle from moving when placed on an inclined surface.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A welding rod and stub apparatus, comprising:
   a receptacle having an open-faced compartment to receive welding rods and stubs therein;
   means on said receptacle to retain said welding rods within said compartment;
   a handle angularly attached to said receptacle, whereby said receptacle can be carried or secured angularly; and
   means formed between said handle and said receptacle to selectively divide said rods in groups by size and type.

2. An apparatus as recited in claim 1, wherein said receptacle comprises:
   a substantially flat bottom wall;
   oppositely disposed side walls having a predetermined height;
   a rear wall having substantially the same height as that of said side walls; and
   a front wall having a height less than that of said side and rear walls, whereby said rods are positioned between said front wall and said handle when said rods are placed in said compartment.

3. An apparatus as recited in claim 2, wherein said front wall includes an upper serrated edge adapted to keep said rods separated.

4. An apparatus as recited in claim 3, wherein said divider means comprises a plurality of divider rods attached between said front wall and said handle.

5. An apparatus as recited in claim 4, wherein said retainer means includes said rear wall having a longitudinal lip member bent inwardly at an angle, to prevent said rods from falling out of said compartment.

6. An apparatus as recited in claim 5, wherein said retainer means includes:
   said handle positioned adjacent said front wall; and
   a retainer rod positioned across said open-faced compartment and adjacent said rear wall.

7. An apparatus as recited in claim 6, including means for securing said receptacle to a fixed structure comprising:
   a first aperture formed in said handle for angularly securing said receptacle; and
   a second aperture formed in said front wall for vertically securing said receptacle.

8. An apparatus as recited in claim 5, including a pick holder member affixed to said rear wall.

9. An apparatus as recited in claim 7, including:
   a plurality of insulated members attached to said bottom wall;
   a magnetic member secured to each of said insulated members; and
   a leg member having a magnet affixed thereto and adapted to be mounted to said magnetic members.

* * * * *